(12) United States Patent
Kage et al.

(10) Patent No.: US 7,646,891 B2
(45) Date of Patent: Jan. 12, 2010

(54) IMAGE PROCESSOR

(75) Inventors: Hiroshi Kage, Tokyo (JP); Kunihiko Hara, Tokyo (JP)

(73) Assignee: Mitshubishi Denki Kabushiki Kaisha, Tokyo (JP)

( * ) Notice: Subject to any disclaimer, the term of this patent is extended or adjusted under 35 U.S.C. 154(b) by 462 days.

(21) Appl. No.: 10/529,202

(22) PCT Filed: Dec. 26, 2002

(86) PCT No.: PCT/JP02/13624

§ 371 (c)(1),
(2), (4) Date: Mar. 25, 2005

(87) PCT Pub. No.: WO2004/062270

PCT Pub. Date: Jul. 22, 2004

(65) Prior Publication Data

US 2006/0152590 A1      Jul. 13, 2006

(51) Int. Cl.
| G06K 9/00 | (2006.01) |
| G06K 9/40 | (2006.01) |
| G06K 9/36 | (2006.01) |
| H04N 5/228 | (2006.01) |
| H04N 5/14 | (2006.01) |
| H04N 9/64 | (2006.01) |

(52) U.S. Cl. ............... 382/107; 382/255; 382/260; 382/276; 348/154; 348/208.1; 348/699; 348/700

(58) Field of Classification Search ........... 382/107; 348/208.1
See application file for complete search history.

(56) References Cited

U.S. PATENT DOCUMENTS

| 5,162,907 A | * | 11/1992 | Keating et al. | ......... 375/240.16 |
| 5,189,518 A | * | 2/1993 | Nishida | ......... 348/208.11 |
| 5,416,557 A | * | 5/1995 | Nagasaki et al. | ......... 396/52 |
| 5,497,191 A | * | 3/1996 | Yoo et al. | ......... 348/208.6 |
| 5,949,481 A | * | 9/1999 | Sekine et al. | ......... 348/207.99 |

(Continued)

FOREIGN PATENT DOCUMENTS

JP          3-201877          9/1991

(Continued)

*Primary Examiner*—Brian P Werner
*Assistant Examiner*—Jose M Torres
(74) *Attorney, Agent, or Firm*—Oblon, Spivak, McClelland, Maier, Neustadt, L.L.P.

(57) ABSTRACT

There is provided an image processor and a method thereof for high-speed compensation for taken-image blurs produced by camera shakes or the like. In the first instance, a motion-detecting area is selected for each of two images taken by an image sensor. When projective data is calculated by means of computing in a predetermined direction pixels of the motion-detecting areas, the motion vector between the two images can be acquired based on the projective data. The image correlativity between the two images is then calculated in the direction that the motion vector designates; and the amount of pixel displacement between the two images is calculated based on the correlativity values acquired by the calculation. Moreover, the area that has been produced by displacing an image output area in a camera-shake compensation area designated in the second frame, by the pixel-displacement amount calculated by a displacement calculator is cut away from the camera-shake compensation area, and is outputted as an image for the image output area of the second frame.

3 Claims, 6 Drawing Sheets

U.S. PATENT DOCUMENTS

| | | | |
|---|---|---|---|
| 6,049,354 A * | 4/2000 | Sekine et al. | 348/208.6 |
| 6,122,004 A * | 9/2000 | Hwang | 348/208.13 |
| 6,370,330 B2 | 4/2002 | Sekine et al. | |
| 6,434,276 B2 * | 8/2002 | Hirosawa et al. | 382/284 |
| 7,218,675 B1 * | 5/2007 | Takahashi | 375/240.16 |

FOREIGN PATENT DOCUMENTS

| | | |
|---|---|---|
| JP | 05-75913 | 3/1993 |
| JP | 5-236334 | 9/1993 |
| JP | 2002-333644 | 11/2002 |

\* cited by examiner (a)

(b)

(c)

(d)

(a)

(b)

(c)

(d)

(e)

IMAGE PROCESSOR

BACKGROUND OF THE INVENTION

1. Field of the Invention

The present invention relates to image processors and processing methods thereof for treating blurs in taken images produced by camera shakes or the like, and particularly to reduction in image-processing time required to compensate the blurs.

2. Description of the Related Art

A great number of digital and movie cameras equipped with an image sensor, such as a CCD (Charge Coupled Device) sensor and a CMOS (Complementary Metal Oxide Semiconductor) sensor, have recently been marketed, and even beginners have been able to readily take still pictures or moving pictures; however, when a general user takes a picture, blurs are inevitably produced in the picture unless a camera is fixed with a tripod or the like; in consequent, various methods have been devised in order to compensate the blurs.

The methods are roughly categorized into two groups. One of the methods is to mechanically control the orientations of lenses and prisms by detecting with an acceleration sensor or the like movement of a camera itself, and the other is to compensate image blurs by applying image processing to the digital data of a taken picture and calculating blurring amounts.

Despite its high accuracy of compensating blurs, the former requires an acceleration sensor and parts for lens control; therefore, there are problems in terms of downsizing and cost reduction of the device. In contrast, despite its disadvantage of deterioration in resolution, the latter can, merely by means of signal processing, provide the compensation for camera shakes, and can be implemented with low cost; therefore, the latter method has been widely utilized.

Japanese Laid-Open Patent Publication 1993-75913 discloses a motion-vector detecting and camera-shake compensating circuits that are examples of conventional arts with regard to the camera-shake compensation utilizing the image processing. In the foregoing Japanese Laid-Open Patent Publication, an input image is divided into a plurality of areas, and motion vectors in selected areas among the plurality of regions are calculated. If the number of the selected areas is increased in order to raise the accuracy of the motion vectors, the calculating amount of the motion vectors increases; therefore, a circuit for determining the reliability of correlativity calculation is provided for each area, and the motion-vector calculation is limited to the areas that are determined by the determining circuit to be reliable; however, when all the areas are reliable, the motion-vector calculation is also carried out in all the areas; thus, processing speed has been an issue to be solved.

SUMMARY OF THE INVENTION

In the present invention, a motion-detecting area, an image output area, and a camera-shake compensation area are set in a two-dimensional image taken by an image sensor. In the first instance, the calculation of projective data, for two images taken by the image sensor, through computing pixel values in the motion-detecting areas in a predetermined direction provides, based on the projective data, a motion vector between the two images. The image correlativity between an image in the image output area of the first frame and an image in the camera-shake compensation area of the second frame is then calculated in the direction that the motion vector designates; and the amount of pixel displacement between the two images is calculated based on the correlativity values acquired by the calculation. Moreover, an area that is displaced by the amount of pixel displacement is cut away from the camera-shake compensation area of the second frame, and is outputted as an image in the image output area of the second frame. According to the present invention, an accurate and high-speed camera-shake compensation function can be implemented.

DETAILED DESCRIPTION OF THE PREFERRED EMBODIMENTS

Embodiment 1

Figure 1:
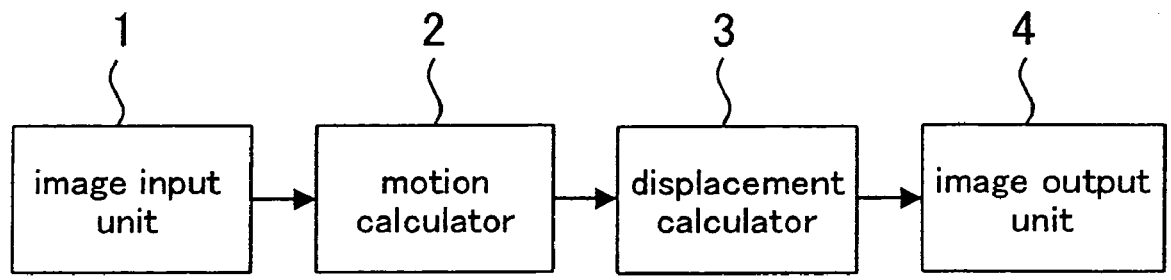
FIG. 1 is a block diagram illustrating the configuration of an image processor according to Embodiment 1 of the present invention.
Figure 2:
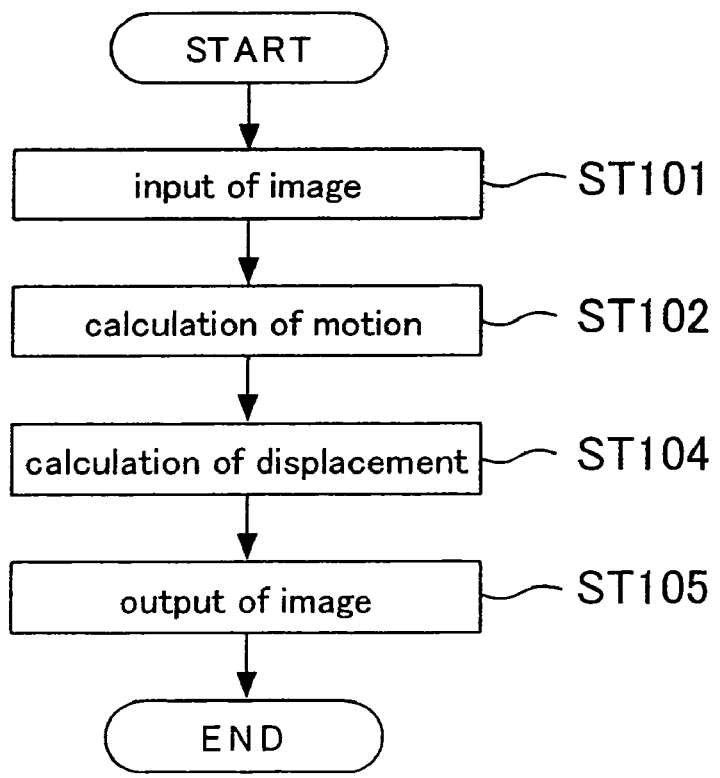
FIG. 2 is a flowchart illustrating the processing procedure according to Embodiment 1 of the present invention.

Embodiment 1 will be discussed below referring to the accompanying drawings. FIG. 1 is a block diagram illustrating the configuration of an image processor according to Embodiment 1 of the present invention, and illustrates four elements—an image input unit 1, a motion calculator 2, a displacement calculator 3, and an image output unit 4. FIG. 2 is a flowchart illustrating the procedure of image compensation.

In the first instance, the image input unit 1 acquires two-dimensional frame images by means of an image sensor such as a CCD sensor or a CMOS sensor (ST101). The motion calculator 2 calculates motion vectors for two consecutive frame images, which have been acquired by the image input unit 1, by utilizing designated motion-detecting areas (ST102). The displacement calculator 3 computes the amount of pixel displacement between the two frame images, by calculating the image correlativity between the two frame images, in a limited direction that a motion vector calculated by the motion calculator 2 designates (ST104). The image output unit 4 cuts away from a camera-shake compensation area of the second frame an area that has been produced by displacing an image output area, by the amount of previously calculated pixel displacement, and outputs the area as a compensated image for the image output area of the second frame (ST105).

Figure 3:
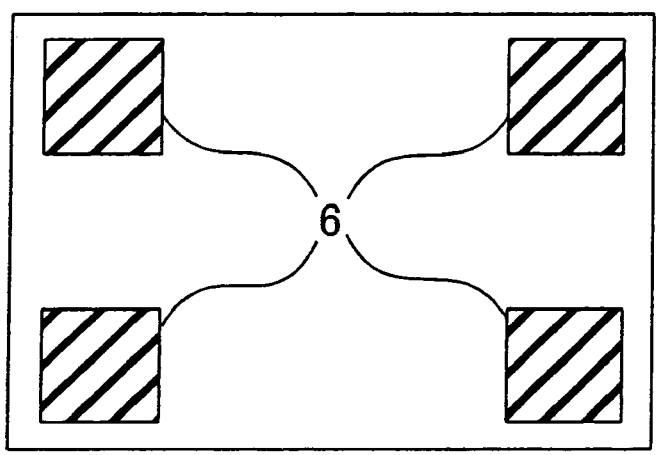
FIG. 3 is a view for explaining the operation of a motion calculator.
Figure 3:
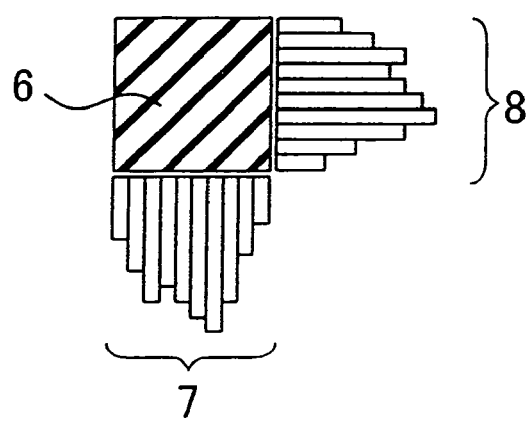
Figure 3:
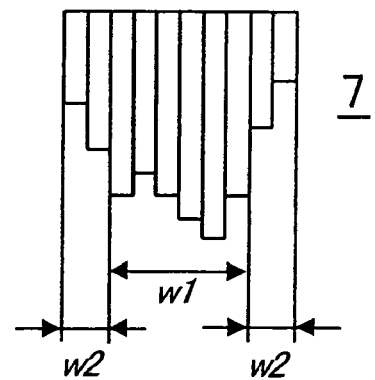
Figure 3:
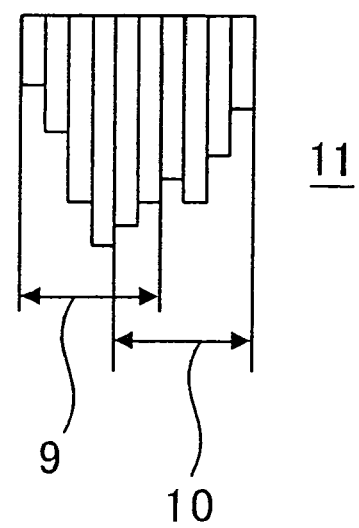

The operation of the motion calculator 2 will be more particularly discussed referring to FIGS. 3 (*a*) through 3 (*d*). In FIG. 3 (*a*), the four rectangular areas illustrated with diagonal lines denote motion-detecting areas 6. In each of motion-detecting areas 6, projective data is acquired by adding up pixel values in the vertical or horizontal direction in which pixels form rows. In this case, the discussion is being made by exemplifying the case where the number of motion-detecting areas 6 is four; however, five or more, or one to three motion-detecting areas 6 may be provided.

FIG. 3 (b) shows vertical projective data 7 that is acquired by adding up pixel values in the vertical direction, and horizontal projective data 8 that is acquired by adding up pixel values in the horizontal direction. In this situation, ten pixels each are included in the vertical and horizontal directions. By utilizing the vertical projective data 7 and the horizontal projective data 8, and by calculating the image correlativity between two frame images, image motion vectors included in the motion-detecting areas 6 can be acquired.

The method for acquiring the horizontal components of the motion vectors will be particularly explained below, by utilizing vertical projective data of two frames. In the first instance, vertical projective data 7 of the first frame is illustrated in FIG. 3 (c); and vertical projective data 11 of the second frame, in FIG. 3 (d). In FIG. 3 (c), the first-frame projective data that is subject to correlativity calculation is included over a range w1; and the first-frame projective data that is not subject to correlativity calculation, over ranges w2. Moreover, in FIG. 3 (d), the leftmost projective data among the projective data of the second frame, which is subject to correlativity calculation, is included over a range 9; and the rightmost projective data, over a range 10. The ranges 9 and 10 each have a width of w1.

The image immediately after the first-frame image is generally chosen as the second-frame image; however, the images that are a predetermined number of frames apart from each other may be chosen. The correlativity calculation between projective data (w1) of the first frame and projective data of the second frame is carried out, displacing either one of the projective data pixel by pixel over the ranges 9 and 10.

In particular, with regard to the first-frame projective data over the range w1 and the second-frame projective data, the absolute values of difference between corresponding projective data are added up, and the resultant sum is employed as a correlativity value. When correlativity calculation is carried out with projective data being displaced pixel by pixel, the location where the correlativity value of the vertical projective data, which is calculated for each place, takes a minimal value corresponds to the horizontal component of a motion vector. For example, with respect to the projective data of the first frame, if a minimal value is produced at a position within the range 9 in the projective data of the second frame, the horizontal component of a motion vector to be acquired is −w2; and if within the range 10, +w2. The same calculation applied to the horizontal projective data 8 provides the vertical component of a motion vector.

In the foregoing manner, a single motion vector is acquired from each of the four motion-detecting areas 6. A motion vector that represents the direction in which a camera equipped with an image sensor has moved is calculated with the four motion vectors acquired in this manner. For that purpose, the average of the four motion vectors, or the average of motion vectors acquired by other methods, e.g., by comparing the direction angles of the four motion vectors and eliminating, as noise, n motion vectors (n is less than 3) that are extremely different in angle and size, and by averaging out (4−n) other motion vectors, may be employed as the representative motion vector.

Figure 4:
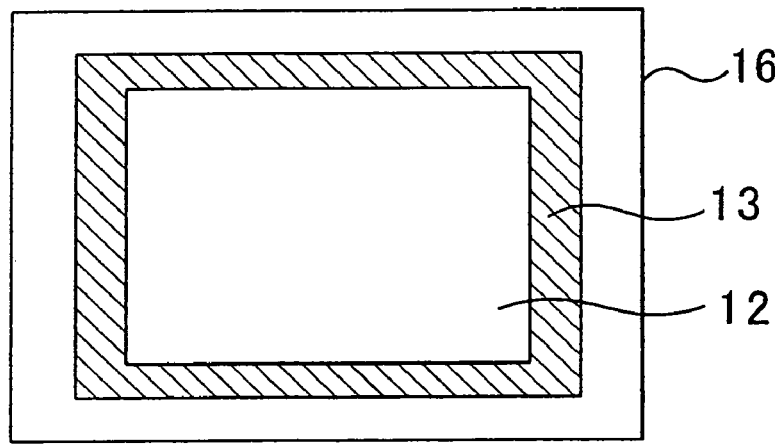
FIG. 4 is a view for explaining the operation of a displacement calculator.
Figure 4:
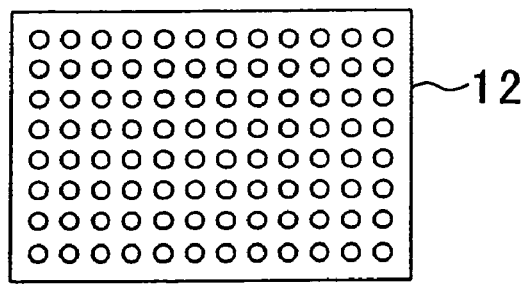
Figure 4:
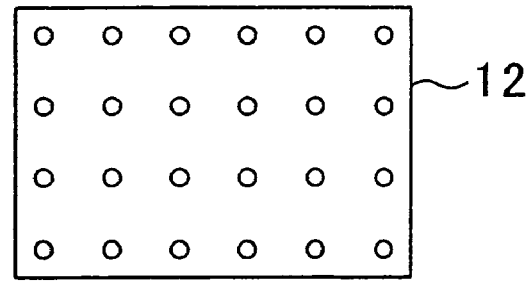
Figure 4:
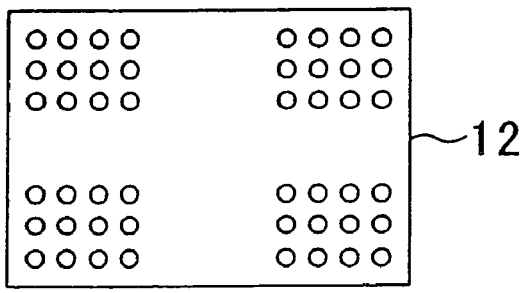
Figure 4:
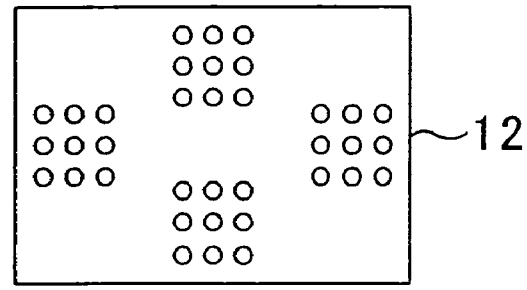

The operation of the displacement calculator 3 will be discussed referring to FIGS. 4 (a) through (e). FIG. 4 (a) shows a sensor pixel area 16 that is a total area of an imaging device, and an image output area 12 that is subject to application of camera-shake compensation. The image output area 12 is displayed to a user. A camera-shake compensation area 13 embraces the image output area 12 and a diagonal-line area illustrated around the image output area 12; a rectangular area having the same size as that of the image output area 12 is cut away from the camera-shake compensation area 13.

When the camera-shake compensation is applied, images of two frames are utilized and the correlativity between the two images is acquired. In this regard, however, an image in the image output area 12 is utilized as the first-frame image; and an image cut away from the camera-shake compensation area 13, as the second-frame image. In other words, extracting from the camera-shake compensation area 13 an image area that has the same size as that of the image output area 12 and that has the greatest correlativity amounts to obtaining a moving image with camera shakes being compensated, when the two images are viewed as time-series images.

In order to calculate the correlativity between the respective images of the output area 12 and the camera-shake compensation area 13, the amount of calculation is reduced by selectively thinning out pixels. FIGS. 4 (b) through (e) shows the concrete examples of the selection methods; FIG. 4 (b) is the method in which pixels are thinned out every several pixels and are uniformly selected over the image output area 12; FIG. 4 (c) is the method in which the thinning-out space in FIG. 4 (b) is extended; FIG. 4 (d) is the method in which pixels to be selected are thinned out and the selection areas are limited to four corners; and FIG. 4 (e) is the method in which the selection areas are limited to areas other than the four corners.

Figure 5:
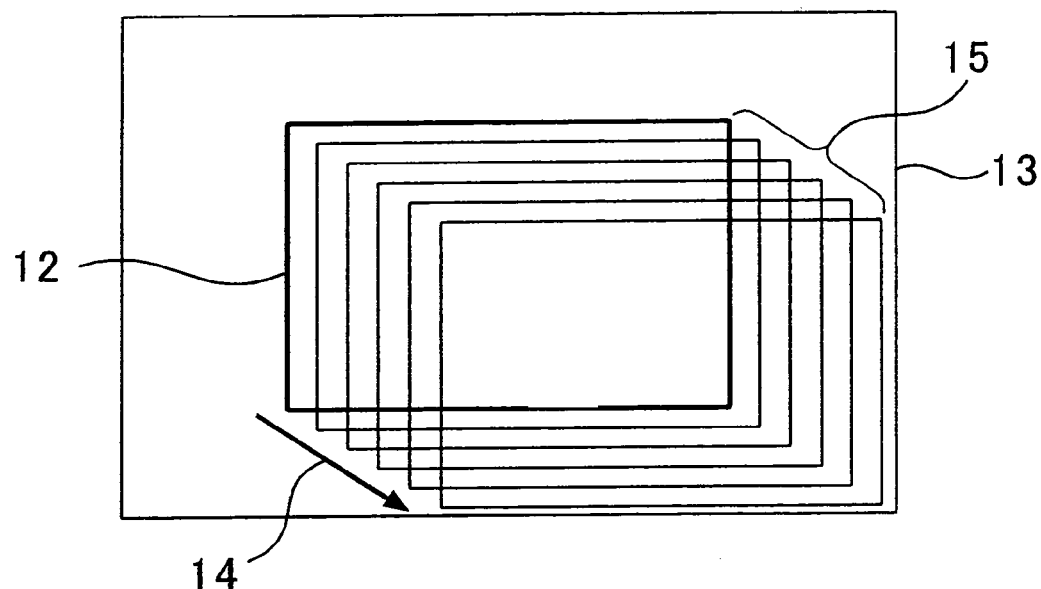
FIG. 5 is a view for explaining the relationship between a basic image area and rectangular areas.

In acquiring image correlativity, the amount of calculation is further reduced by thinning out and selecting the pixels that are subject to application of the camera-shake compensation, as described above, and by limiting the direction in which image correlativity is calculated to a single direction based on the motion vector calculated by the motion calculator 2. In other words, as illustrated in FIG. 5, in selecting the most correlative area within the camera-shake area 13 of the second frame, with respect to the basic image 12 of the first frame, image correlativity is calculated with regard to rectangular areas 15 that align along the direction 14 of the motion vector calculated by the motion calculator 2 and that have the same size as that of the image output area 12, and the most correlative area among the rectangular areas 15 is selected.

When, as a concrete way of calculating image correlativity, the absolute values of the differences between the values of corresponding pixels are calculated, and the sum of the absolute values is acquired as a correlativity value, the correlativity value takes its minimal value in the area that has the greatest correlativity. Accordingly, by calculating correlativity values along the direction of the motion vector 14, and by selecting among the rectangular areas an area that provides the minimal value, the most correlative area can be selected.

Because the image output unit 4 outputs, as an image for the image output area 12 of the second frame, a rectangular area having the strongest correlativity with the image that has been subject to the calculation by the displacement calculator 3, and that is in the image output area 12 of the first frame, a camera-shake-compensated image for the image output area 12 in FIG. 3 (a) can be obtained.

The image processing method for taken images discussed above is implemented by image-compensation programs, which are provided, being recorded in recording media that can be read by a computer or the like.

In addition, in the motion calculator 2, with regard to the acquisition of projective data that the motion-vector calculation requires, the case has been exemplified, wherein the sensor pixel area 16 is subject to the data-acquisition; however, the projective data may be acquired from an image in a partial image area that is cut away from an input image taken by the image input unit 1. Moreover, the calculation of projective data may be implemented by an ASIC (Application Specific IC), and the motion vectors may be calculated by utilizing the projective data acquired in this manner.

Still moreover, in the motion calculator 2, the motion vectors have been acquired through correlativity calculation without increasing resolution, i.e., the number, of projective data for motion-vector calculation; however, the same motion-vector calculation with the resolution of the projective data being raised by means of interpolation improves the accuracy of calculated motion vectors, and the comparison range of image-correlativity calculation in the displacement calculator 3 can be reduced.

As discussed above, according to Embodiment 1, the motion calculator 2 calculates motion vectors for an image taken by the image input unit 1; the displacement calculator 3 calculates the amount of pixel displacement between two frames, by limiting the image-correlativity calculation in the directions of motion vectors and thereby reducing the amount of its calculation; and the image output unit 4 creates an output image, by cutting a partial area with the amount of pixel displacement being cancelled out; therefore, an image with pixel displacement produced by camera shakes being compensated can be obtained at high speed.

Embodiment 2

Figure 6:
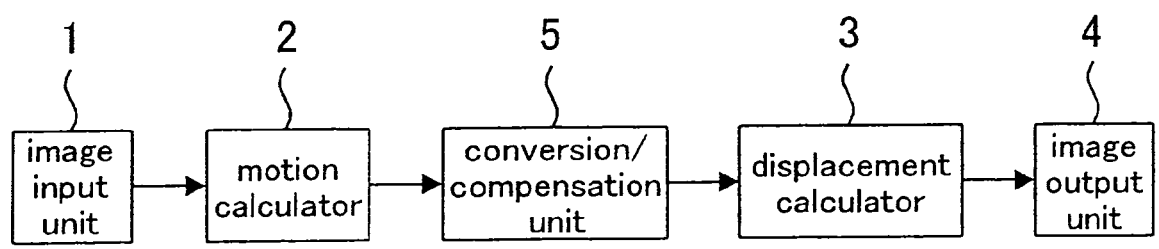
FIG. 6 is a block diagram illustrating the configuration of an image processor according to Embodiment 2 of the present invention.
Figure 7:
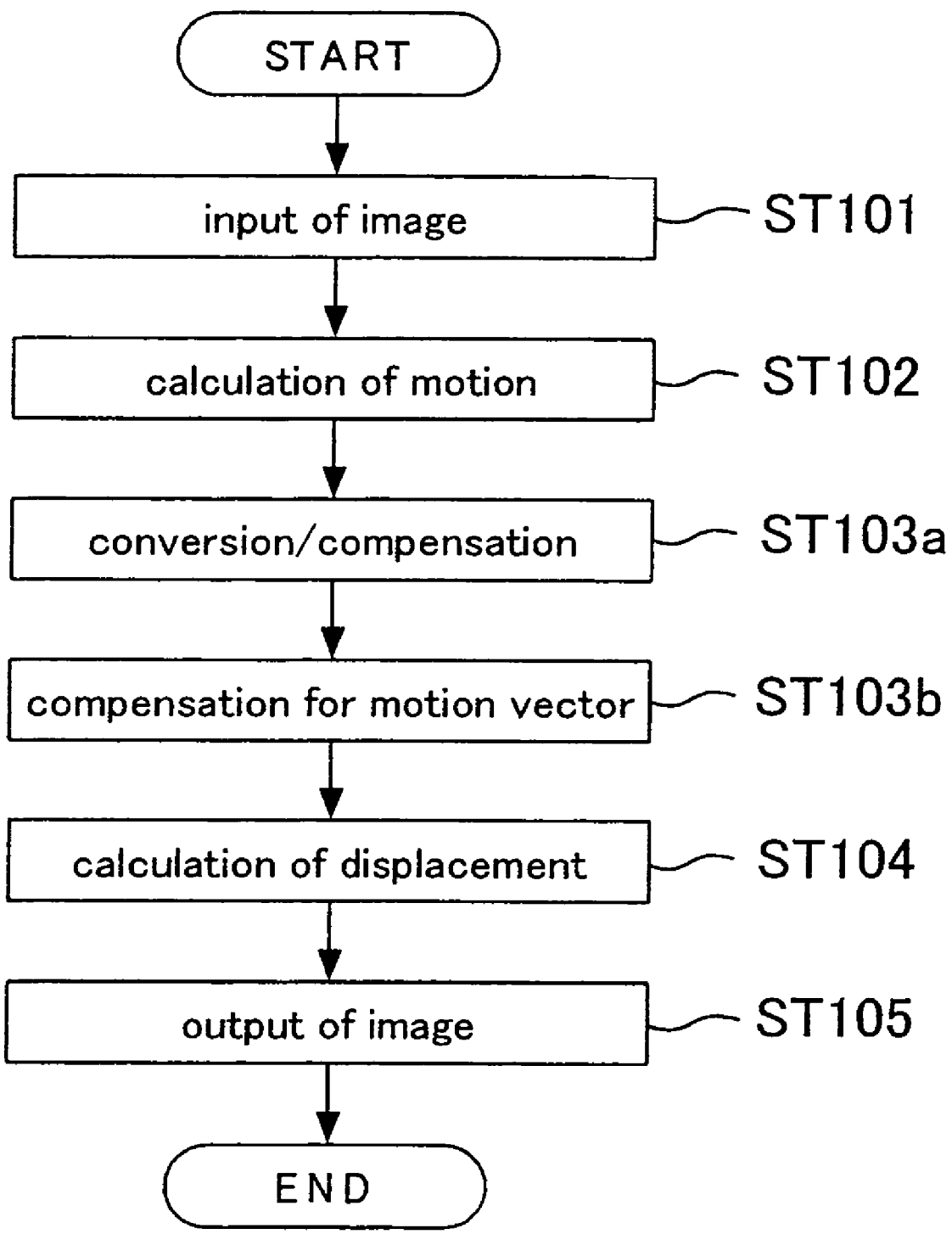
FIG. 7 is a flowchart illustrating the processing procedure according to Embodiment 2 of the present invention.

Embodiment 2 will be discussed below, referring to the drawings. FIG. 6 is a block diagram illustrating the configuration of an image processor according to Embodiment 2 of the present invention, and the present image processor is constituted from the five units, including a conversion/compensation unit 5 in addition to the constituent elements in Embodiment 1. Moreover, FIG. 7 is a flowchart illustrating the procedure of image compensation.

The operation of the image input unit 1, the motion calculator 2, the displacement calculator 3, and the image output unit 4 is the same as that in Embodiment 1. The conversion/compensation unit 5 detects pivoting and zooming components in a plurality of motion vectors calculated by the motion calculator 2, and applies the pivoting and zooming conversion to an input image, by utilizing the motional components.

Figure 8:
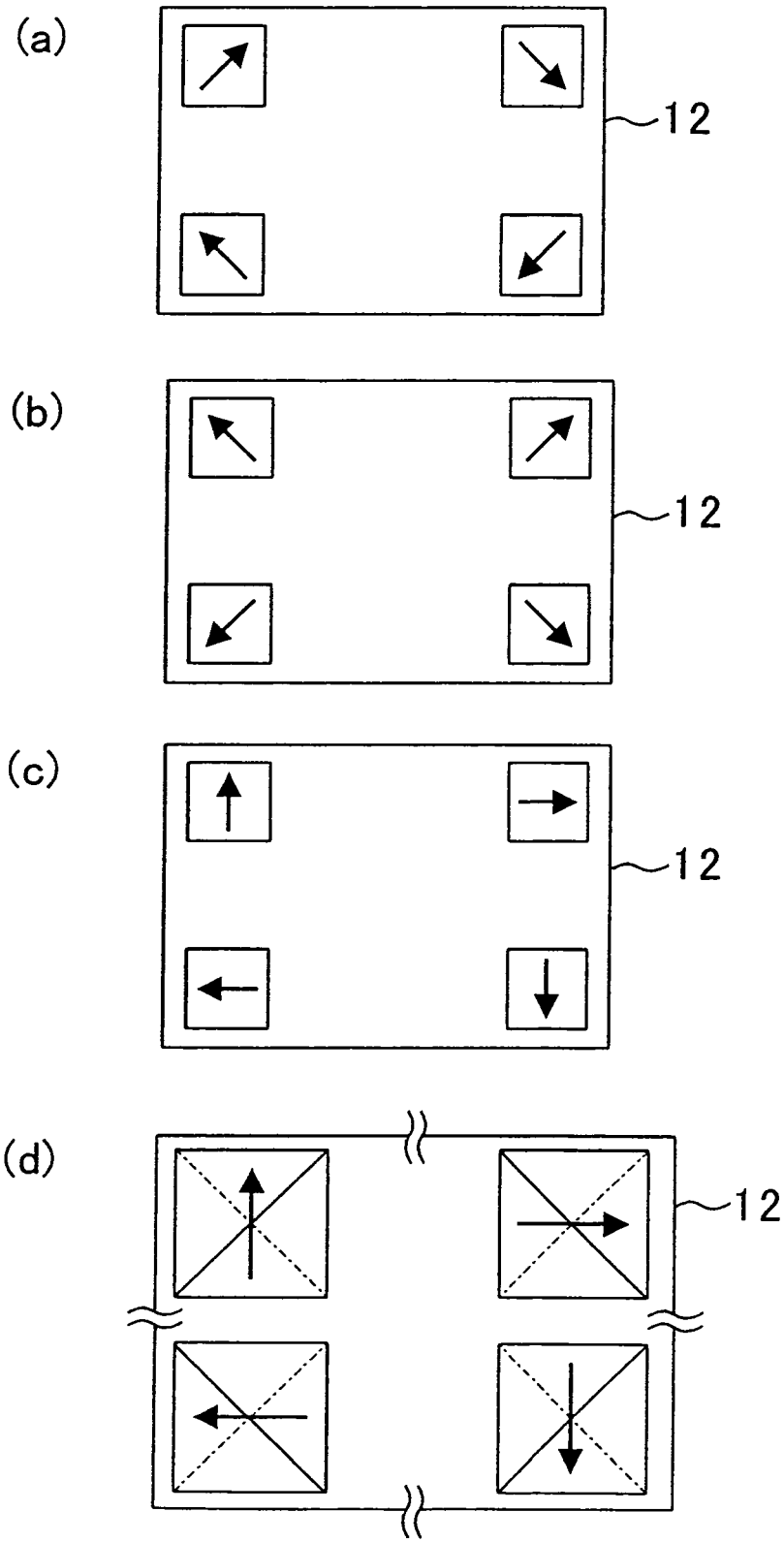
FIG. 8 is a view for explaining the operation of a conversion/compensation unit.

The operation of the conversion/compensation unit 5 will particularly be discussed below. FIG. 8 is a view for explaining a method for detecting, from four motion vectors calculated by the motion calculator 2, camera pivoting on the shot axis and camera expanding/contracting (zooming) movement associated with advancing and retreating along the shot axis. The camera shake discussed in Embodiment 1 is translational movement in parallel with the imaging area of a camera; however, it is an object of Embodiment 2 to detect, as the movement of a camera, pivoting and zooming components other than translational components. The case will be discussed below, where the movement of a camera itself consists merely of pivoting and zooming components.

FIG. 8 (*a*) illustrates patterns of four motion vectors in the case where the movement of a camera consists merely of pivoting components; and FIG. 8 (*b*) illustrates patterns of four motion vectors in the case where the movement of a camera consists merely of zooming components. In cases where only pivoting components or zooming components independently appear without being mixed with each other, pivoting or zooming components are quantitatively calculated utilizing the strength of each motion vector.

As in FIG. 8 (*c*), in cases where pivoting or zooming components are mixed up, each motion vector is separated into pivoting and zooming components, and then each motional component is calculated. FIG. 8 (*d*) is a view illustrating a method for calculating pivoting and zooming components for the motion vectors, which consist of pivoting and zooming components, as illustrated in FIG. 8 (*c*); the solid lines denote auxiliary lines for calculating pivoting components, and dotted lines, for calculating zooming components. In other words, when the four motion vectors are projected on the respective auxiliary lines that are perpendicular to each other, and when the vectors projected are acquired as the pivoting and zooming components of the respective motion vectors, the calculation can be carried out, in the same way as in the case where respective components independently appear.

In order to cancel out each motional component of a camera, by utilizing pivoting and zooming components that are quantitatively calculated through the foregoing procedure, conversion in the reverse direction to the pivoting and zooming components detected is applied to the acquired data for an image in the second frame. In addition, with regard to each of the components, the correlativity between the data for the second-frame image and the data for the first-frame image is calculated by converting the data for the second frame image in constant increments, e.g., by single degrees for pivoting components and by multiples of 0.1 for zooming components. The selection of the second-frame image that has the highest correlativity amounts to reproducing an image whose pivoting and zooming components have been cancelled out (ST103*a*).

Because actual motion vectors include pivoting and zooming components, the subtraction of the pivoting and zooming components acquired by the foregoing procedure from the motion vectors leaves only translational components that are in parallel with the imaging area of a camera. The motion vectors acquired in this manner are hereinafter referred to as compensated motion vectors. In the same manner as in Embodiment 1, a representative motion vector, which indicates the direction in which a camera equipped with an image sensor has moved, is calculated, by utilizing the compensated motion vectors (ST103*b*).

Next, the displacement calculator 3, by utilizing the representative motion vectors, selects the most correlative rectangular area within the camera-shake area 13 of the second frame, with respect to the location of the basic image area 12 of the first frame, as illustrated in FIG. 5. In addition, by utilizing the reproduced second-frame image whose pivoting and zooming components have been cancelled out and the first-frame image in the basic image area, motion vectors can be acquired again.

Because the image output unit 4 outputs, as an image for the image output area 12 of the second frame, a rectangular area that has been calculated to have the strongest correlativity with the image in the image output area 12 of the first frame, an image compensated for camera shakes with regard to the image output area 12 can be obtained.

The image processing method for taken images discussed above is implemented by image-compensation programs, which are provided being recorded in recording media that can be read by computers or the like.

The present invention relates to the technology for compensating blurs in taken images by means of image processing in order to prevent the deterioration of two-dimensional images, which is caused by camera shakes produced during taking pictures by the camera, and the present invention can be applied to digital cameras and movie cameras that allow even beginners to readily enjoy still or moving images whose blurs are not conspicuous.

Because this invention may be embodied in several forms without departing from the spirit of the essential characteristics thereof, the present embodiments are therefore illustrative and not restrictive, since the scope of the invention is defined by the appended claims rather than by the description preceding them, and all changes that fall within the metes and bounds of the claims, or the equivalence of such metes and bounds, are therefore intended to be embraced by the claims.

What is claimed is:

1. An image processor comprising:
   an image input unit configured to receive two-dimensional images;
   a motion calculator configured to select a plurality of motion detecting areas for each of two images received by the image input unit, and configured to calculate motion vectors between the two images, with regard to each of the plurality of motion detecting areas, based on projective data that is acquired by computing, in a predetermined direction, pixel values in the motion detecting areas;
   a conversion/compensation unit configured to calculate pivoting and zooming components by means of the plurality of motion vectors calculated by the motion calculator, and configured to apply pivoting and zooming conversion to the second image, based on the pivoting and zooming components, and configured to acquire a compensated motion vector by subtracting the pivoting and zooming components from the plurality of motion vectors;
   a displacement calculator configured to calculate the image correlativity between the two images, in a direction that the compensated motion vector designates, and configured to calculate the amount of pixel displacement between the two images, based on the correlativity calculations; and
   an image output unit configured to cut away an area from a camera-shake compensation area designated in a frame, the area being produced by displacing an image output area in the camera-shake compensation area, by the pixel-displacement amount calculated by the displacement calculator, and configured to output the area as an image for the image output area of the frame.

2. An image processing method implemented on an image capture device, comprising:
   receiving two-dimensional images;
   selecting a plurality of motion detecting areas for each of two received images, and calculating motion vectors between the two images, with regard to each of the plurality of motion detecting areas, based on projective data that is acquired by computing, in a predetermined direction, pixel values in the motion detecting areas;
   calculating pivoting and zooming components by means of the plurality of calculated motion vectors, and applying pivoting and zooming conversion to the second image based on the pivoting and zooming components;
   calculating a compensated motion vector by subtracting the pivoting and zooming components from the plurality of motion vectors;
   calculating the image correlativity between the two images, in a direction that the compensated motion vector designates, and calculating the amount of pixel displacement between the two images, based on the correlativity calculations; and
   cutting away an area from a camera-shake compensation area designated in a frame, the area being produced by displacing an image output area in the camera-shake compensation area, by the pixel-displacement amount, and outputting to a display the area as an image for the image output area of the frame.

3. A recording media encoded with an image compensation program configured to cause an information processing apparatus to execute a method, the method comprising:
   selecting a plurality of motion detecting areas for each of two received images, and calculating motion vectors between the two images, with regard to each of the plurality of motion detecting areas, based on projective data that is acquired by computing, in a predetermined direction, pixel values in the motion detecting areas;
   calculating pivoting and zooming components by means of the plurality of calculated motion vectors, and applying pivoting and zooming conversion to the second image based on the pivoting and zooming components;
   calculating a compensated motion vector by subtracting the pivoting and zooming components from the plurality of motion vectors;
   calculating the image correlativity between the two images, in a direction that the compensated motion vector designates, and calculating the amount of pixel displacement between the two images, based on the correlativity calculations; and
   cutting away an area from a camera-shake compensation area designated in a frame, the area being produced by displacing an image output area in the camera-shake compensation area, by the calculated pixel-displacement amount, and outputting the area as an image for the image output area of the frame.

* * * * *

UNITED STATES PATENT AND TRADEMARK OFFICE
CERTIFICATE OF CORRECTION

PATENT NO. : 7,646,891 B2  Page 1 of 1
APPLICATION NO. : 10/529202
DATED : January 12, 2010
INVENTOR(S) : Kage et al.

It is certified that error appears in the above-identified patent and that said Letters Patent is hereby corrected as shown below:

On the title page, Item (73), the Assignee's information is incorrect. Item (73) should read:

-- (73) Assignee: Mitsubishi Denki Kabushiki Kaisha, Tokyo (JP) --

Signed and Sealed this

Thirtieth Day of March, 2010

David J. Kappos
*Director of the United States Patent and Trademark Office*